Patented Aug. 13, 1940

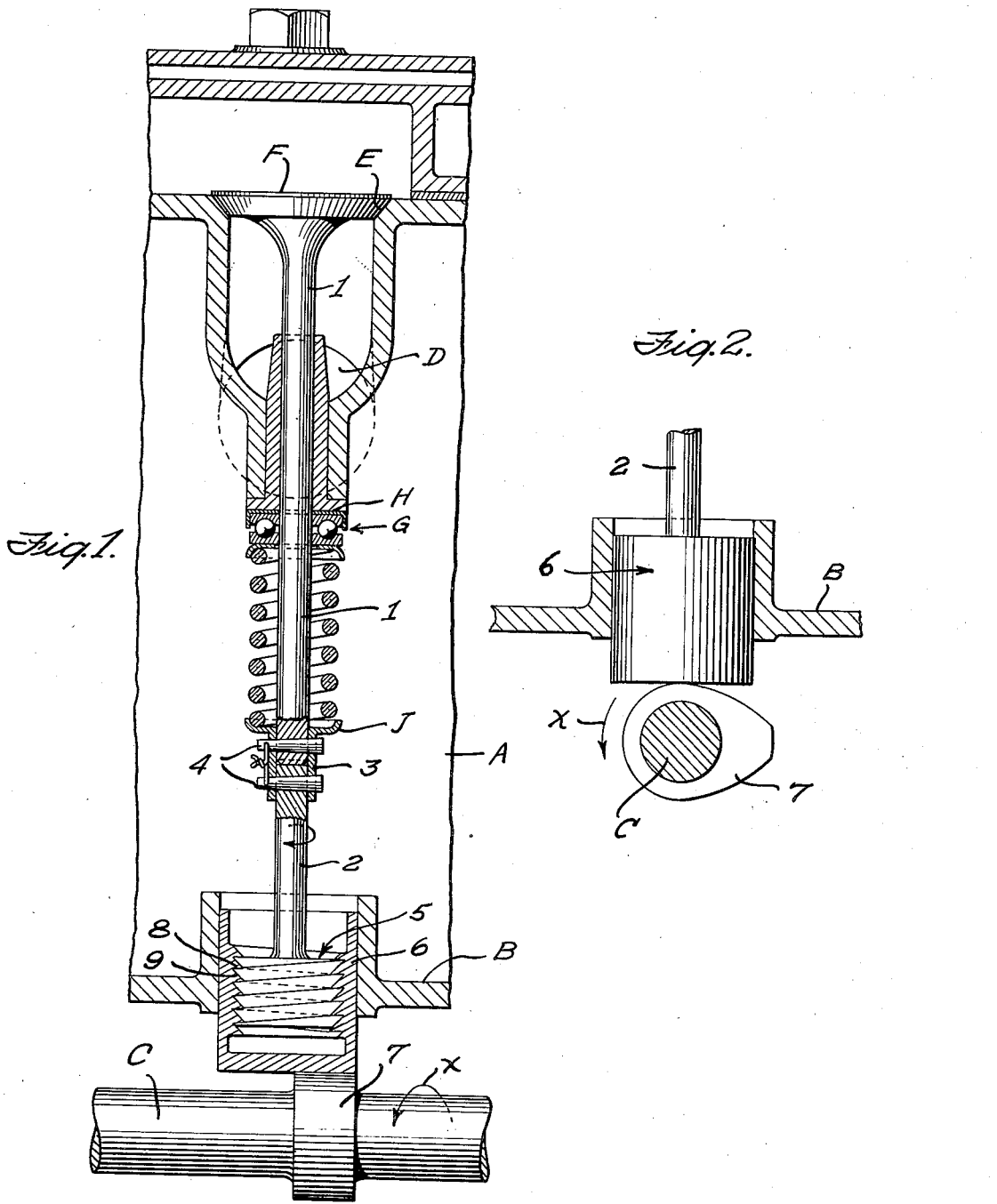

2,211,585

UNITED STATES PATENT OFFICE 2,211,585

SELF-ADJUSTING CAM-LIFT POPPET VALVE

Samuel W. Rushmore, Plainfield, N. J.

Application June 23, 1939, Serial No. 280,745

3 Claims. (Cl. 123—90)

This invention relates to automatic clearance adjusters for cam operated engine valves, and more particularly to the class in which the thrust elements between the cam and the valve are caused to become longer or shorter under the action of screw-threaded means. It relates also to automatic valve rotating means for equalizing the wear of poppet valves and their seats.

My present device differs from prior clearance adjusters wherein screw adjustable elements are embodied in a separate "tappet" which has only thrust engagement with the valve stem elements. As contrasted with these, I automatically screw adjust the effective length of parts carried by the valve stem itself; so as to attain, and at all times maintain, the desired minimum or optimum amount of back-lash between the valve-lifting cam and the valve thrust element engaged thereby; while at the same time causing a desired intermittent rotation of the valve that equalizes the wear of the valve upon its seat so that the valve will remain permanently tight without necessity of occasional re-grinding.

The above and other features of my invention will be more fully understood from the following description in connection with the accompanying drawing, in which Fig. 1 shows the valve, valve stem and cam shaft in side elevation, and adjacent cooperating parts of the engine in section, in a plane including the axis of the cam shaft and the axis of the valve stem;

Fig. 2 is a detail view, partly in elevation and partly in section, in a plane at a right angle to the plane of Fig. 1.

As the novel mechanical features of my invention may be adapted to function successfully in combination with a great variety of specifically different means for driving and lubricating cam-operated poppet-valves, it will be understood that in the present drawing, A represents the rear wall and B the bottom of a conventional valve compartment of an internal combustion engine; also that cam shaft C is rotatably mounted in bearings in a conventional communicating compartment, not shown; also that both compartments are copiously supplied from the crank case with relatively viscous cylinder oil by conventional means, not shown; also that the engine exhaust passage D, valve seat E, valve F, and the valve closing spring, are conventional. That is to say, the novel principles of my invention are applicable for novel combination with the above or other equivalent valve reciprocating and lubricating elements.

As shown in Fig. 1, the valve stem I is rigidly coupled with an aligned stem section 2, by means of sleeve 3 and wedge pins 4, so that the two are functionally one integral stem. The stem section 2 carries at its lower end, rigid therewith, a short, large-diameter screw-threaded member or plug 5, which has screwed thereon a cylindrical cup shaped member 6 the bottom of which normally bears upon the valve lifting cam 7.

The cam 7 is off-set to engage the bottom of this screw cup 6, wholly on one side of the vertical axis thereof, thus applying an unbalanced horizontal effort tending to rotate the screw-cup. The screw being a right-hand screw, the normal rotation of the cam shaft, which is in the direction of arrow $x$, tends to unscrew the cup downward on the plug 5, thus in effect increasing the length of the valve stem.

Of course, such unscrewing, if uncontrolled, would serve to increase the effective length of the valve stem so much that the valve F would be held off its seat, even when the bottom of the cup rests upon the small-diameter, semi-cylindrical portion of the cam. In order to understand how this effect is avoided, it must be remembered that the cam and valve are copiously supplied with cylinder oil from the crank case and even the atmosphere in the valve compartment contains large percentages of suspended oil. One result is that such oil normaly bathes the screw threads in the cup 6; also such cylinder oil is relatively viscous and materially modifies and controls characteristic functionings of the cam and cup, as will be explained.

When the valve is closed and the cup is not in contact with the cam, the cup will hang suspended on the screw plug, with the lower face of the cup thread resting on the upper face 8 of the plug thread. As the threads are not a tight fit, and as the area of these contacting faces is quite large in relation to the weight of the cup and oil therein, there is always a considerable thickness of film of the relatively viscous oil between said contacting surfaces.

Furthermore, when the cup is resting on the cam but in contact with only the small-diameter semi-cylindrical part of the cam, there will likewise be a considerable film of oil between the lower surface of the cup and the contacting surface of the cam. In short, so long as the cup rests only upon the cylindrical part of the cam, there will be substantial slip between the cam and cup surfaces, because during this half revolution of the cam, there is only the viscous drag of the oil film plus the action of gravity, tending to rotate and unscrew the cup; and this relatively small unscrewing tendency is resisted by the film tension of the heavy oil between the contacting surfaces of the plug and cup screw threads. In other words, the counterbalance of oil film drag by the cam, as against the oil film compression resistance between the threads, automatically limits the extent to which the cup can be unscrewed by the drag of the oil film. Thus during all the time while the valve is in closed position, the tappet cup will simply ride upon the oil film on said cylindrical portion of the cam, and during that time, the only thrust clearance between the valve and the cam will be the thickness of the oil film between the screw threads of the cup and plug.

However, as the cam is rotated further, in the direction shown, the tangential surface of the cam lug will begin to contact with the bottom surface of the cup. At this instant there will be exerted upon the cup a combined rotating and lifting moment; so that the cup starts to rise and screw upward, but rotation of the plug is resisted by the seated valve; so the oil at 9, between the upper face of the cup thread and the lower face of the plug thread, will be largely squeezed out, and these faces of the screw threads will be forced into intimate contact by a screw wedge action which will set up a relatively high frictional resistance to further relative rotation between the cup and the screw plug. But maximum rotative effect of the cam on the cup is limited by slip-friction of the heavy oil film between them, so it is only necessary to properly design the area and pitch of the screw threads with reference to slip-friction of the cam, in order to make the said wedging friction between the threads great enough to overcome the driving friction of the cam and cause the cam to slip on the bottom of the cup. Thus the wedging friction of the threads stops rotation of the cup, and the cup becomes essentially rigid with the plug, and transmits the thrust of the cam, to lift the valve, without any further screw effect.

This squeezing out of oil and wedge locking of the threads at 9 is almost instantaneous, say ⅟₁₀₀ of a second for 1200 R. P. M. of the engine, and this locking is instantly followed or even partially overlapped by camming of the valve free from its seat; and as soon as the valve does break contact with its seat, it is free to rotate, and all further rotating effort of the cam on the cup is relieved by relatively free rotation of the valve itself.

This release of rotary stress, resulting from breaking of the valve from its seat for relatively free rotation, is an extremely important factor in enabling oil film friction between the threads of the cup and plug to completely control and limit unscrewing of the cup, because the time of maximum unscrewing effect of the cam is practically instantaneous as compared with almost a semi-circle of rotation of the cam while the valve is off its seat, and free to rotate; plus the semi-circle of rotation on the cylindrical part of the cam while the cup is being unscrewed solely by drag of the oil film on the cam.

In cases where it is desirable to have the rotary effect of the cam on the cup relieved by rotation of the valve, more promptly and completely than would otherwise be possible, it may be desirable to have a ball thrust bearing G between the end of the valve closing spring, and its stationary thrust abutment, at H. However, in the specific instance described below, I employed only the usual thrust shoulder J on the valve stem to take the valve spring thrust, yet, with the cam running at about 1000 R. P. M., and with about ⅜ inch cam lift, the valve rotated at about one revolution per second, which is considered ample for proper distribution of valve face wear.

As noted above, the balance of forces whereby the down screwing of the cup is controlled, depend on proper design of the area and pitch of the cup and plug screw threads. The thread areas depend on various factors such as diameter of the screw, and depth of the threads; and I prefer a diameter which may be one-half that of the valve, more or less. A consideration is that the greater the diameter of the screw-plug, the less will be the difference in wedging angles of its thread tips as compared with its valleys. The wedging angle of the thread should be great enough to approximate but not closely approach a wedging angle which will make it a slip screw, when the maximum endwise pressure of the valve spring is applied to open the valve.

When the threads are of a depth to give large area surfaces from between which the oil films are to be squeezed out by endwise plus rotary efforts applied to the cup by the cam, the cross-section of the threads lengthwise of the cam become of considerable importance and an important feature of my invention is making this thread section what I call "saw-tooth" as shown in Fig. 1; that is, contacting thread surfaces 8 which take down-pull of the cup, are "flat"; and the opposite faces 9 which take the opposite upward thrust of the cam, against down pressure of the closing spring, are "sloping." More accurately stated, the "flat" faces of the plug thread are such as would be generated by a radial line at right angles to the axis; and the other faces such as would be generated by a line at much less than a right angle to the axis; both generating lines being assumed to travel helically about the axis of the screw. It will be obvious that the "flat" faces have less area than the "sloping" faces. Furthermore, their upward wedge action is simply and solely longitudinal helix angle of the screw, while the sloping faces have substantially greater area and have a compound wedging action which is a resultant of the helix angle taken with its acute angle slope in a radial plane.

It will be obvious that the compound slope of such sloping faces, will lock the cup against being rotated by compression parallel with the axis, much more powerfully than would "flat" faces. In actual practice, it has been found by tests that a screw thus designed as shown in Fig. 1, even when dry, has much more resistance to compression thrust than to elongation pull.

All of these multitudinous factors have been tested out in a particular case, using a valve from a 108 h. p. 6-cylinder Crane-Simplex engine which was about 2 inches in diameter. The screw plug was slightly more than half the diameter of the valve, say, 1⅜ inches; had "saw-tooth" threads about ⅛ inch in depth; and the pitch of the threads was about 6 per inch, making 4½ for the ¾ inch axial length of this particular plug. On a diameter of 1⅜ inches, this makes the pitch angle of the tips of the threads about 2½°; and the valleys about 4°.

With the parts of dimensions given above and the valve spring under normal tension as employed in the engine, I have found upon test, that the cup tends at all times to "ride" upon the oil films between the screw threads and between the cup face and the cylindrical part of the cam, and never in actual metal to metal contact with the result that when the camshaft is stopped suddenly, whether from a low speed or from a speed of 1100 R. P. M. or more, the cup may always be screwed down a relatively minute distance corresponding to but a very few thousandths of an inch of oil film.

The above described action is well proved in practice in the following manner: If, before starting the camshaft, (the valve is deliberately screwed upward in the cup, so that the valve is held up by as much as ¼ of an inch above the seat, and the camshaft is then started, and run at any rate within the range of working speeds, the valve will, after some fifteen or twenty "taps" descend until it seats properly.

On the other hand, if the tappet cup is first deliverately spun upward by as much as ¼" away from contact with the cam and the camshaft then started, likewise, after a few "taps," the cup will descend until it reaches the normal position of operation.

It is noted that when the valve is open, it is rotating at considerable speed and the instant it contacts with its seat, the resistance applied tangentially at the periphery of the cam, stops its rotation practically instantly, while inertia tends to cause the cup to continue rotation for an instant. Such rotation is in the right direction for screwing the cup downward upon the cam, and it continues until resisted and finally stopped by the wedging resultant of pressures, downward upon the cylindrical part of the cam and upward upon the under face of the plug thread.

I have thus far secured perfect operation with the sloping faces of the thread at an angle of 45° from the axis, but this angle will depend somewhat upon the pitch of the thread and speeds of operation; and I propose also to employ a more acute wedging angle, say, 35 degrees from the axis, particularly for very high speed engines and where high valve spring pressures may be found necessary. Furthermore, it will be obvious that while "flat" faces at right angles to the axis have proved successful, particularly in combination with acute sloping faces extending to the bases of the flat faces, there are many coordinate factors, such as diameter of screw plug, depth of screw thread, pitch of thread, looseness of fit of screw thread, etc.; and enough of these have been tested to make certain that the desired locking of the cup under lifting thrust of the cam may be obtained by multitudinous variations, provided the various factors are coordinated, in accordance with the principles which I have discovered and hereinabove set forth.

In this connection it may be remembered that there are many ways of making the surface area of one face of the thread, different from the area of the other face; also of making the wedging angle of one face different from that of the other face.

For instance, any screw may have one of its helical faces helically relieved so as to present smaller contact area than the other. Even an ordinary screw, having threads with both surfaces equally and oppositely inclined to the axis of the screw may be caused to have an effective wedging angle in one direction, greater than in the other direction, merely by relieving one face at the base where the wedging angle is greatest, and the other face adjacent the tips where the wedging angle is least. In any screw the threads may have the base of adjacent threads separated by cylindrical surfaces forming the shank of the screw; or the tips may be turned off to a cylinder; not to mention other variations between the limits of the thread of triangular cross-section and one of regular cross-section.

Other features may be varied: For instance, reversal would be possible, making the cup integral with the valve stem, and having the plug ride on the cam, provided the "sloping" surfaces of the threads, are arranged to transmit the lifting cam thrust and the "flat" faces are arranged to take the tension, but in such case proper lubrication would be more difficult.

I claim:

1. A poppet valve and means for operating it, including a stem for transmitting thrust to open the valve, a helical spring encircling the stem and applying thrust to close the valve, and a cam for opening it, the stem of the valve carrying a plug screw, and a cup screwed thereon having a bottom face adapted to ride on the cam, and said cam being offset with respect to the axis of the screw and rotated in a direction to exert an unscrewing as well as lifting effort on said cup.

2. A poppet valve and means for operating it, including a stem for transmitting thrust to open the valve, a helical spring encircling the stem and applying thrust to close the valve, and a cam for opening it, the stem of the valve carrying a plug screw, and a cup screwed thereon having a bottom face adapted to ride on the cam, and said cam being offset with respect to the axis of the screw and rotated in a direction to exert an unscrewing as well as lifting effort on said cup; the threads having their cam-thrust receiving surfaces sloping radially at an acute angle of approximately 45° to 35° from the axis of the screw.

3. A poppet valve and means for operating it, including a stem for transmitting thrust to open the valve, a helical spring encircling the stem and applying thrust to close the valve, and a cam for opening it, the stem of the valve carrying a plug screw, and a cup screwed thereon having a bottom face adapted to ride on the cam, and said cam being offset with respect to the axis of the screw and rotated in a direction to exert an unscrewing as well as lifting effort on said cup; the threads having their cam-thrust receiving surfaces sloping radially at an acute angle of approximately 45° to 35° from the axis of the screw; and their cup-suspending surfaces flat, their straight line elements being at approximately right angles to the axis of the screw.

SAMUEL W. RUSHMORE.